June 1, 1971 R. J. LOUBIER 3,581,361
METHOD AND APPARATUS FOR FABRICATING A BALL AND SOCKET ASSEMBLY
Filed Dec. 13, 1968 3 Sheets-Sheet 1

INVENTOR.
ROBERT J. LOUBIER,
BY *Hood, Gust, Irish & Lundy*
ATTORNEYS.

June 1, 1971    R. J. LOUBIER    3,581,361
METHOD AND APPARATUS FOR FABRICATING A BALL AND SOCKET ASSEMBLY
Filed Dec. 13, 1968    3 Sheets-Sheet 2
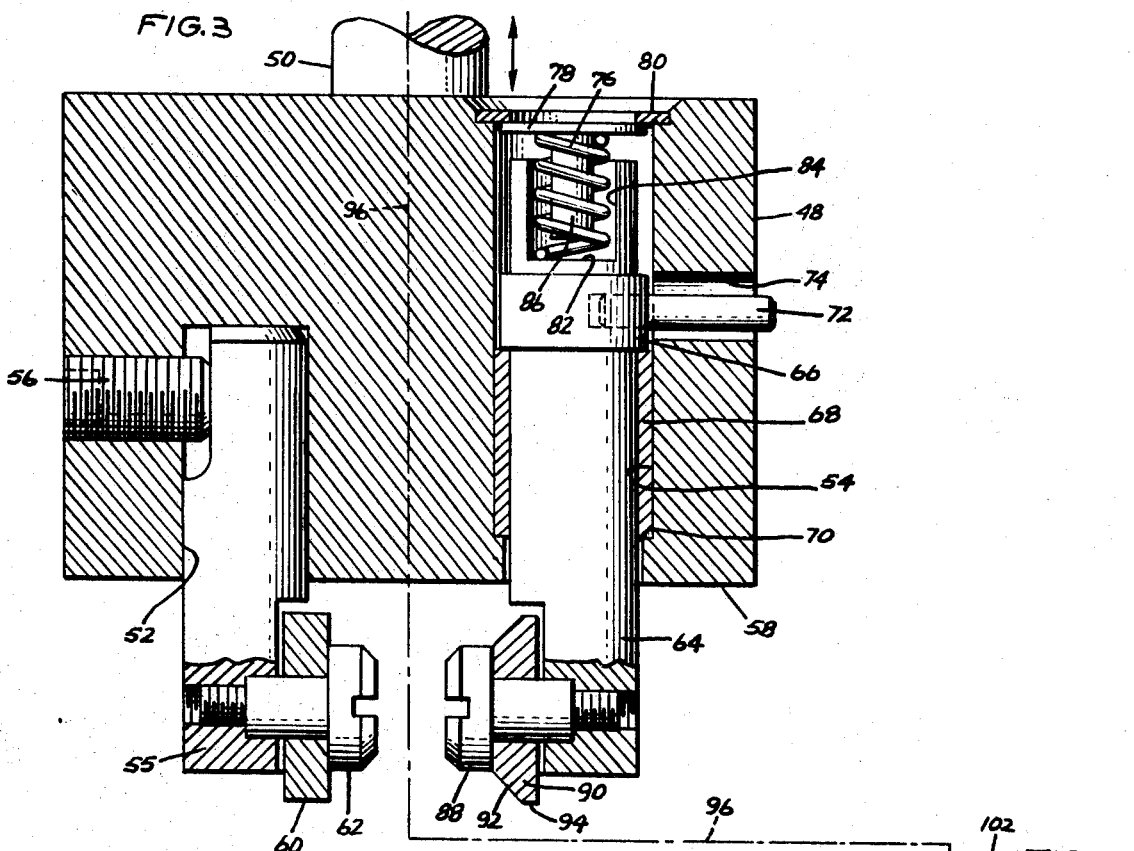
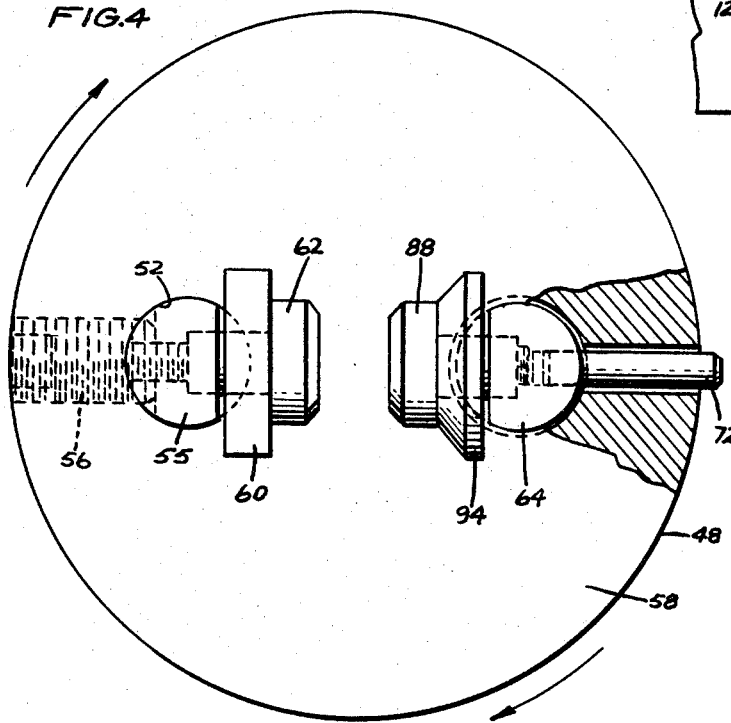
INVENTOR.
ROBERT J. LOUBIER,
BY Hood, Gust, Oriel & Lundy
ATTORNEYS.

INVENTOR.
ROBERT J. LOUBIER,
BY Hood, Gust, Irish & Lundy
ATTORNEYS.

United States Patent Office 3,581,361
Patented June 1, 1971

3,581,361
METHOD AND APPARATUS FOR FABRICATING A BALL AND SOCKET ASSEMBLY
Robert J. Loubier, Fort Wayne, Ind., assignor to Tuthill Pump Company, Chicago, Ill.
Filed Dec. 13, 1968, Ser. No. 783,642
Int. Cl. B23p 11/00, 19/04
U.S. Cl. 29—149.5B
10 Claims

ABSTRACT OF THE DISCLOSURE

The present invention involves a method of fabricating a ball and socket assembly comprising the steps of inserting an out-of-round ball member into a socket having a protruding portion, and forming this protruding portion into operative engagement with only the larger diameter portions of the ball member. When the ball member is swung to its operative position, the necessary free-swiveling clearances are automatically provided.

The apparatus of this invention includes a supporting frame for holding a workpiece in position, a first tool movable in a predetermined direction for exerting a coining force on a workpiece held in the supporting frame in a direction transverse to said predetermined direction, a second tool for exerting a coining force on the workpiece in a direction substantially parallel to said predetermined direction, means for moving the first and second tools sequentially into engagement with the workpiece with the first tool engaging the workpiece in advance of the second tool, and means for rotating the first and second tools in unison relative to the supporting frame whereby both said tools may perform a coining operation on the workpiece.

BACKGROUND OF THE INVENTION

Field of the invention

The present invention relates to a ball and socket assembly and more particularly to a method and apparatus for fabricating the same.

Description of the prior art

Ball and socket assemblies commonly referred to as "rod ends" utilize in the design thereof a socket of annular shape which retains a ball in such position that opposite end portions of the latter project from opposite sides of the socket. Such sockets are commonly fabricated of integral segments of raw stock which may either be forged or coined into the socket shape. In fabricating the socket, the ball, which is prehardened, is inserted into the socket, which is thereafter deformed or coined onto and against the ball as a backing to form the shape of the retaining socket. Since the ball itself forms part of the die, it must be prehardened. This method of fabricating the ball and socket is inherently time-consuming and expensive. Furthermore, considerable difficulty is involved in attaining proper operating clearances. If the clearances are not adequate, there will be an undue amount of friction which resists swiveling movement.

SUMMARY OF THE INVENTION

In accordance with the broader aspects of this invention, there is provided a method of fabricating a ball and socket assembly by inserting an out-of-round ball member into a previously drilled cavity having a protruding lip portion, and providing a socket by forming the lip portion into operative engagement with the ball member with the latter in such position that the lip portion operatively engages only the larger diameter portions of the ball member. The ball member is so formed that when it is swiveled to a position at which the smaller diameter portions thereof are opposite the lip portion, the ball has free swiveling clearance in the socket. The ball need not be prehardened in order to accomplish this coining operation and provision of swiveling clearance is automatically obtained.

With respect to the apparatus, a first supporting frame is provided for holding a workpiece, a first tool is mounted for movement in a predetermined direction for exerting a coining force on a workpiece in a direction transverse to the predetermined direction, a second tool is mounted for exerting a coining force on the workpiece in a direction substantially parallel to said predetermined direction, means is provided for moving the first and second tool means sequentially into engagement with said workpiece with the first tool engaging the workpiece in advance of the second tool, and means being provided for rotating the first and second tools in unison relative to the supporting frame whereby both the tools may perform a coining operation on the workpiece in sequence.

It is an object of this invention to provide a method whereby a ball and socket assembly of the type contemplated hereinabove may be fabricated expeditiously, efficiently and economically.

It is another object of this invention to provide a method of assembling ball and socket joints whereby clearances between the ball and socket are positively controlled and automatically provided.

It is still another object of this invention to provide a method wherein a protruding flange surrounding a cavity may be conveniently coined inwardly in a direction to obstruct removal of a ball therefrom, this operation being performed quickly and efficiently in achieving a finished structure.

It is still another object of this invention to provide an apparatus for fabricating a ball and socket assembly of the type contemplated hereinabove, which is simple in construction and efficient and economical in operation.

It is still another object of this invention to provide such an apparatus which may be so operated as to spin a portion of a socket into operative engagement with a ball member in such a way that free, swiveling clearances are automatically provided.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIGS. 3 and 3a are longitudinal sectional views of one embodiment of the apparatus of this invention with a workpiece mounted in position therein for having the coining operation performed thereon;

FIG. 4 is a bottom view of the apparatus of FIG. 3;

Figure 1:
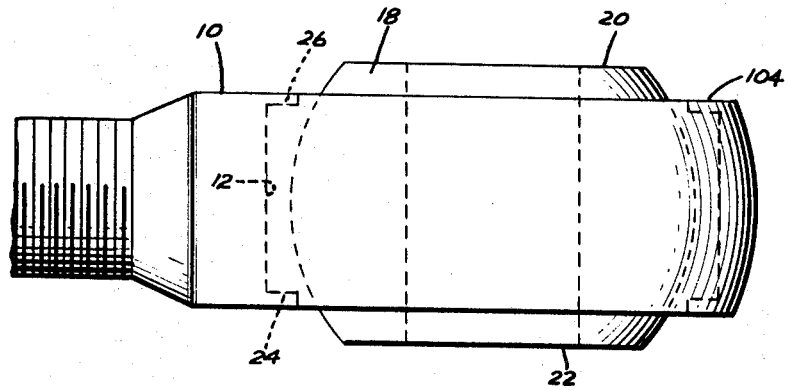
FIG. 1 is a fragmentary side view of a ball and socket assembly or "rod end" of this invention.

Referring to the drawings, and more particularly to FIGS. 1, 2, 5 and 6, a rod end is shown in which a flattened body of metal 10 having a threaded stud 12 on one end thereof is provided with a machined cavity 12 of cylindrical shape having two bearing rings 14 and 16 positioned therein. A metallic ball member 18 having opposite flattened ends 20 and 22, respectively, are positioned in a socket formed by the two bearing members 14 and 16 such that the ball member may swivel therein. Two rings 14 and 16 are held in the cavity 12 by means of two inturned annular flanges 24 and 26, these flanges being shown in finished form in FIGS. 1 and 2 and in various stages of processing in FIGS. 5 and 6.

Figure 5:
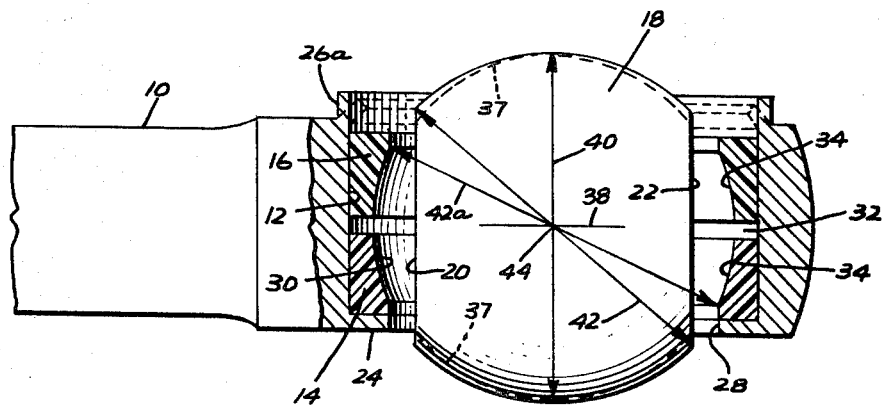
FIG. 5 is a fragmentary sectional view used in explaining the method of this invention.
Figure 6:
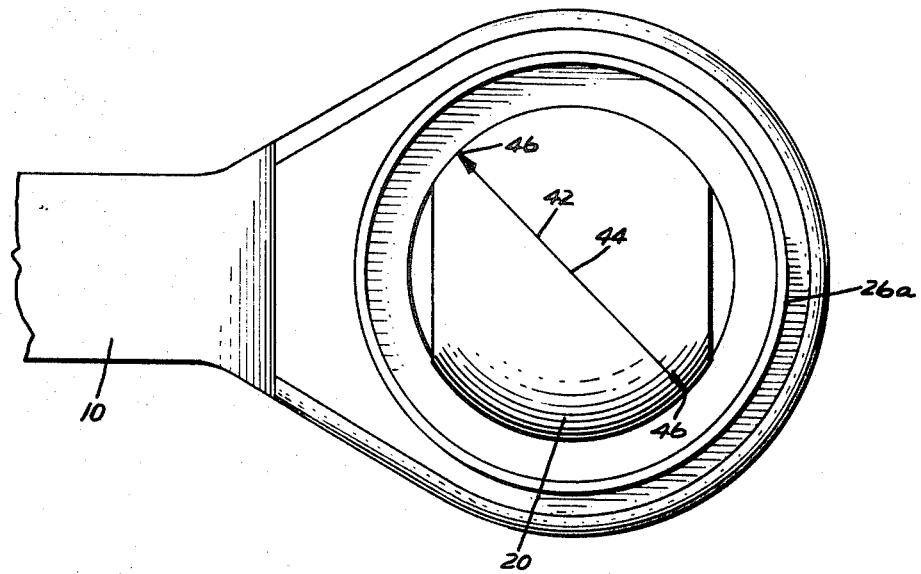
FIG. 6 is a front view of the arrangement of FIG. 5.

More specifically, and referring to FIGS. 5 and 6, in the method of fabricating the rod end, the cavity 12 is preferably formed by drilling to a cylindrical shape to a position just short of passing completely through the body 10 to thereby form the annular lip 24. A hole previously drilled through the body 10 determines the size of the inner perimeter 28 of the flange 24. A bearing ring 14 formed to the shape shown and of a suitable plastic material such as nylon, Teflon or a similar lubricious material is first fitted into the socket 12 in snug, abutting engagement with the flange 24. The inner surface 30 of the ring 14 is formed with a curvature which is primarily spherical. The ball 18 is inserted into the ring 14, and the ring 16 like the ring 14 but of opposite shape is inserted into the cavity 12 but against the ball 18. The two rings 14 and 16 are sized such that when they are installed as shown in FIG. 5 and as just described, there will be a slight clearance 32 therebetween. The two rings 14 and 16 together form a socket denoted by the numeral 34 which is primarily spherical in shape and against which the ball 18 slides.

In the formation of the cylindrical cavity 12, the same machining operation produces the cylindrical interior of a protruding lip or flange 26a (FIGS. 5 and 6). The outer circumference of this lip 26a may previously have been machined in a screw machine or lathe operation. In the final fabrication, this lip 26a is bent or coined radially inwardly to the position of flange 26 as shown in FIG. 1 into intimate engagement with the bearing 16, thereby urging the latter into engagement with the ball member 18. The ball member 18 is thereby trapped in the socket formed by the two rings 14 and 16 but is free to swivel therein.

The ball member 18 is shown as having a cylindrical bore 36 which opens through the flat sides 20 and 22, but as will be apparent to persons skilled in the art, this bore may be eliminated or altered in design without departing from the spirit and scope of this invention. The ball member 18 may be made of hardened steel, but on the other hand may be unhardened as will become apparent from the description that later follows.

As shown more clearly in FIG. 5, the ball member 18 is generally spherical but more specifically is slightly out-of-round. Preferably, the shape is that of an ellipsoid with the opposite ends being cut off. While the shape of an ellipsoid constitutes the preferred embodiment of this invention, as will become apparent from the following description, the shape may vary somewhat so long as certain dimensional requirements are met. With respect to the ellipsoidal shape as shown in FIG. 5, the degree of out-of-roundness is illustrated by comparison with the shape of a true circle or sphere as indicated by the dashed line 37. The major axis of the ellipsoid is indicated by the numeral 38, and the ball member 18 is symmetrically formed thereabout.

Being ellipsoidal, the minor diameter 40 is smaller than the "angular diameter" 42 which is drawn through the center 44 of the ball member to extend between the points 46 on the ball member surface which are spaced farthest apart. If the ball member 18 is truly symmetrically about its major axis 38, the center 44 will be located midway between the ends of the major axis which intersects the planes of the two ends 20 and 22.

As viewed in FIG. 5, it should be observed that as the diameter 40 is swung in either direction in the plane of the drawing about the center 44, its length will gradually elongate in the following ellipsoidal shape until it eventually coincides with the longest diameter 42. While the ball member 18 need not necessarily be a true ellipsoid in shape, it nevertheless is necessary that the diametral dimension 42 be greater than the dimension 40. In actual practice, this difference in dimension need only be negligible, and in an operative embodiment of this invention, the difference in these two dimensions for a ball member 18 of about ¾ inch in diameter is about .005 inch. The ball member is therefore only slightly ellipsoidal or out-of-round when compared with a true sphere.

In the assembly operation, prior to coining the lip 26a inwardly, the ball 18 is rotated to the position shown in FIGS. 5 and 6. The two rings 14 and 16 now abut snugly against the ball member 18. With the rings so held in position by the ball 18, the lip 26a is coined inwardly against the ring 16 as previously explained. Upon the completion of this operation, the two rings 14 and 16 have portions spaced apart a distance equal to the length of the diameter 42a which is equal to the diameter 42. In other words, the inner bearing surfaces of the two rings 14 and 16 are spaced apart diametrically a distance corresponding to the maximum diameter of the ball member 18. Upon coining the lip 26a inwardly against the ring 18 which forces the latter into intimate engagement with the ball member 18, the ball member may be rotated to any position such as that shown in FIGS. 1 and 2. In this position as well as any normal operating position, a clearance will exist between the internal surfaces of the rings 14 and 16 and the ball member 18, this being attributable to the fact that the ball member 18 is slightly out-of-round.

By locating the rings 14 and 16 onto the large diameter portion of the ball member 18, positive control of the dimensional tolerances between the ball and socket is achieved. If a greater dimensional tolerance is desired, it is only necessary to shorten the minor diameter 40 or lengthen the angular diameter 42 of the ball member 18. On the other hand, if it is desired to reduce the operating clearances, it is only necessary to make the ball member 18 conform more to the shape of a sphere, or in other words enlarge the diameter 40.

As will now be apparent, fabricating the ball and socket assembly according to this method results in the swiveling clearances being automatically provided and uniformity being achieved in production runs of high volume.

The technique described hereinabove for obtaining the operating clearances between the ball and socket is similar to that disclosed in Davies et al. Pat. No. 3,141,231.

The apparatus used in the fabrication of the rod end thus far described is shown more clearly in FIGS. 3 and 4. A frame or tool holder 48 formed of a cylindrical block of steel is adapted to be mounted in a press machine for vertical and rotary motion, a supporting post 50 serving as a part of the means for mounting the holder 48 in the press. The holder 48 is provided with two vertical bores 52 and 54 spaced apart as shown. The bore 52 receives a cylindrical post 55 which is removably rigidly secured therein by means of a set screw 56. The post 55 projects from the bottom 58 of the holder 48 as shown and receives on the lower end thereof a forming tool in the form of a cylindrical roller 60. A shoulder screw 62 mounts the roller 60 on the post 55 as shown for rotation about a horizontal axis. The periphery of the roller 60 extends below the bottom end of the post 55 for a purpose which will become apparent from the description that follows.

Received for reciprocation in the bore 54 is a cylindrically shaped plunger 64 having an annular shoulder 66 adapted to engage the upper end of a bearing sleeve 68 securely fitted into the bore 54. The engagement between the shoulder 66 and the bearing 68 limits the downward movement of the plunger 64 to that shown. An annular portion 70 in the bore 54 serves as a stop for limiting downward movement of the sleeve 68.

A limit pin 72 is press-fitted into the plunger 64 to extend laterally therefrom and extends with clearance through a vertically elongated slot 74 in the holder 48. A clearance is provided between the upper end of this slot 74 and the pin 72 so as to permit limited upward movement of the plunger 64. A slight clearance laterally between the pin 72 and the slot 74 is provided to prevent rotation of the plunger 64 in the bore 54.

A helical compression spring 76 is mounted in the upper end of the bore 54 to engage at its upper end a rigid backing plate 78 held against upward movement by means of a retaining ring 80 in the bore 54. The lower end of the spring 76 engages the bottom 82 of a cylindrical socket 84 in the upper end of the plunger 64, a plunger 86 being disposed internally of the spring 76 and secured to the plate 78 as shown. A clearance is provided between the post 86 and the bottom 82 of the socket 84 to determine the extent of upward movement of the plunger 64 in the bore 54 for a reason which will become apparent from the explanation that later follows.

A shoulder screw 88 mounts for rotation a roller 90 on the bottom end of the plunger 64 as shown. The two shoulder screws 62 and 88 are horizontally aligned such that the axes of rotation of the two rollers 60 and 90 are coextensive and are disposed horizontally. The periphery of the roller 90 is formed as shown with one part 92 thereof at an angle of 45° to the axis of rotation and with the remaining portion 94 truly cylindrical and of a diameter slightly larger than the roller 60.

The two rollers 60 and 90 are equally spaced on opposite sides of the vertical axis 96 of rotation of the holder 48 as shown.

A supporting platform 98 stationarily and rigidly mounted is positioned immediately beneath the two holders 48 and more particularly the rollers 60 and 90, and is provided with a nesting portion 100 in the upper surface thereof which conforms precisely to the shape of the workpiece or rod-end 102 of the preceding FIGS. 1, 2, 5 and 6. This workpiece 102 is shown in the same position as FIG. 5, with the nest 100 being conformed to the shape shown in FIG. 6. More particularly, the nest 100 is so shaped that with the workpiece 102 positioned therein, it is held firmly against horizontal and downward movement.

With all of the parts 14, 16 and 18 assembled as explained hereinabove in connection with FIGS. 5 and 6, and with the ball member 18 positioned with its larger diameter portion engaged by the bearing rings 14 and 16, the workpiece 102 is in readiness for a coining operation to be performed by the rollers 60 and 90. As shown, the lip 26a is disposed directly beneath two rollers 60 and 90. Before starting the coining operation, the holder 48 is elevated to the position shown. The holder 48 is thereupon set into rotary motion about the vertical axis 96 and is also moved downwardly until the angled surface 92 of the roller 90 engages the lip 26a. The point of engagement of the lip 26a with the angled surface 92 is so determined that the periphery of the roller 60 will remain out of engagement therewith. As the holder 48 is further lowered, the lip 26a will be formed inwardly to the position 26b, which is at an angle of 45° with the vertical. At this point, the cylindrical portion 94 engages the horizontal, planar surface 104 of the body 10 and rides in a circular motion therearound. Further downward movement of the holder 48 will thereupon result in an upward force being exerted on the plunger 64 against the action of the spring 76. With continued downward movement of the holder 48, the periphery of the roller 66 engages the lip 26b, flattening it to the position indicated by the numeral 26 in FIG. 1 into firm engagement with the bearing ring 16. This flattening is sufficiently forceful to urge the ring 16 into engagement with the ball member 18 and the latter into engagement with the bearing ring 14, seating the ring 14 onto the flange 24 (FIG. 1). The tool holder 46 may now be lifted out of engagement with the workpiece 102 and the latter removed from the nesting portion 100 as a finished assembly.

It will now be obvious that while the motion of the holder 48 is continuously downward until the lip is folded over to its retaining position, the coining operation is in two distinct stages, the roller 90 serving to form the lip to position 26b and the roller 60 thereafter completing the forming operation. When the operation is completed, the flange 26 (FIG. 1) appears to be identical to that of the flange 24, being flush with the surface 104. The roller 60 is wide enough to engage both the surface 104 and the lip 26b to produce the flush surface just mentioned.

In forming the lip 26a initially, its thickness dimension is made preferably the same as that of the flange 24, and its height is made such that when it is finally coined over into its socket-forming position, the two flanges 24 and 26 will be substantially identical.

Figure 2:
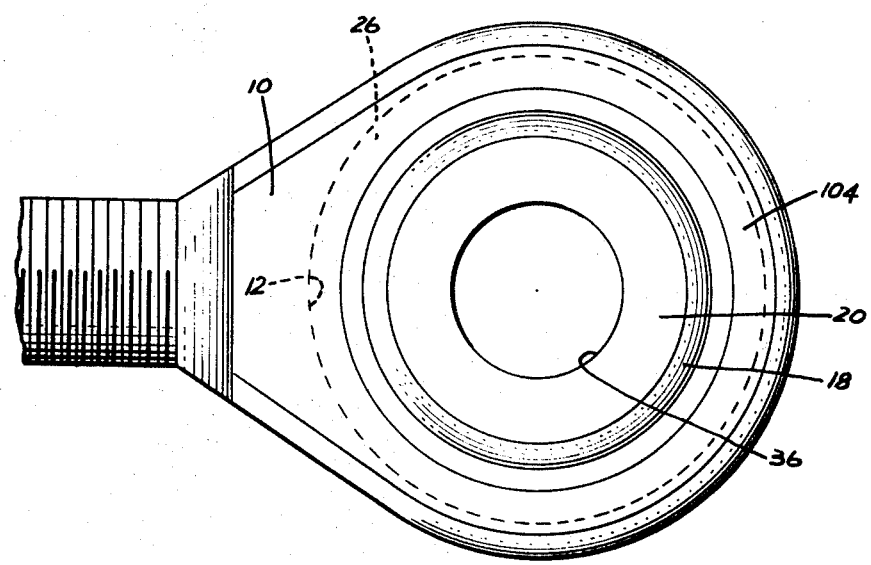
FIG. 2 is a plan view thereof.

After the workpiece 102 has been completed, the ball member 18 is rotated to the position shown in FIGS. 1 and 2, in which it will have a swiveling clearance with the bearing rings 14 and 16. Inaccuracies in the machining operations prior to this coining operation will not interfere with obtaining the desired swiveling clearance between the ball member 18 and the rings 14 and 16 as the entire coining operation is performed against the larger diameter portion of the ball member 18. Thus, necessary swiveling clearances are automatically provided when the ball member 18 is swung to its operative position.

While there have been described above the principles of this invention in connection with specific apparatus, it is to be clearly understood that this description is made only by way of example and not as a limitation to the scope of the invention.

What is claimed is:

1. The method of fabricating a ball and socket assembly comprising the steps of inserting an out-of-round ball member into a cavity having a protruding portion, and forming said protruding portion into operative engagement with said ball member with the latter in such position that said protruding portion operatively engages only the larger diameter portions of said ball member.

2. The method of claim 1 and including the step of fitting a bearing element between said ball member and said socket, and forcefully forming said protruding portion into retaining engagement with said bearing element thereby forcing the latter into engagement with the larger diameter portions of said ball member.

3. The method of claim 1 and including forming said cavity with a radially inturned annular flange that serves as the cavity bottom, seating a first annular bearing element onto said bottom flange, installing said ball member into said cavity in engagement with said bearing element, placing a second annular bearing element onto said ball member and into seating engagement with said cavity, and forcefully forming said protruding portion against said second bearing element and the latter against said ball member thereby retaining said ball member within said cavity.

4. The method of claim 3 in which said cavity is cylindrically shaped and said bearing elements have inner surfaces curved generally to conform to the shape of said ball member, said protruding portion being an annular flange which protrudes axially beyond said cavity, said forming step including spinning said protruding flange radially inwardly into engagement with said second bearing element.

5. The method of claim 4 including forming said bearing elements with outer surfaces which intimately slidingly fit into said cavity and forming said bearing elements to such size that a clearance is provided therebetween when assembled with said ball member in said cavity.

6. Apparatus for fabricating ball and socket assemblies comprising first frame means for holding a workpiece, first tool means movable in a predetermined direction for exerting a coining force on a workpiece in a direction transversely to said predetermined direction, second tool means for exerting a coining force on said workpiece in a direction substantially parallel to said predetermined direction, means for moving said first and second tool means sequentially into engagement with said workpiece with said first tool means engaging said workpiece in advance of said second tool means, and means for rotating said first and second tool means in unison relative to said frame means whereby both said tool means may perform a coining operation on said workpiece.

7. The apparatus of claim 6 including means for mounting said first tool means for reciprocal movement relative to said second tool means in a direction substantially parallel to said predetermined direction, said mounting means including means yieldably urging said first tool means in a direction opposite to said predetermined direction.

8. The apparatus of claim 7 in which said rotating means includes a second frame means which mounts both said tool means, said second frame means being rotatable with respect to said first frame means, said first and second tool means including first and second forming tools, respectively, positioned such as to describe a common circle as said second frame means rotates.

9. The apparatus of claim 8 in which said second frame means includes a single rotatable tool holder, said mounting means of said first tool means including a member movably mounted on said tool holder, said yieldable means including a spring, said first forming tool including a first wheel having a work-engaging surface inclined to said predetermined direction, said second forming tool including a second wheel having a work-engaging surface at right angles to said predetermined direction, and means for normally positioning said first and second wheels such that the axes thereof substantially coincide.

10. The apparatus of claim 9 in which said tool holder has two spaced-apart vertical bores, said member of said mounting means being a plunger mounted in one of said bores for vertical movement, said positioning means including engaging shoulders on said plunger and in said one bore, said second wheel being mounted on a protruding end of said plunger for rotation about a horizontal axis, said spring being compressed between the other end of said plunger and abutment means on said holder, said holder being journaled for rotation about a vertical axis located between said bores, the inclined surface on said first wheel being annular and facing the last-mentioned axis, said inclined surface being at an angle of approximately 45° to the vertical, said first wheel having an outermost rim portion adapted to engage said workpiece, a supporting post locked into the other bore with the lower end protruding beneath said holder, said second wheel being mounted on the protruding portion of said post for rotation about a horizontal axis, said second wheel having a cylindrical outer surface, the outer diameter of said first wheel being slightly larger than that of said second wheel, said wheels being disposed equal distances from said last-mentioned axis opposite each other.

References Cited
UNITED STATES PATENTS

| | | | |
|---|---|---|---|
| 2,947,063 | 8/1960 | Teeple, Jr. | 29—149.5B |
| 3,068,552 | 12/1962 | Williams et al. | 29—149.5 |
| 3,141,231 | 7/1964 | Davies et al. | 29—149.5 |
| 3,371,398 | 3/1968 | Patterson et al. | 29—149.5 |
| 3,422,520 | 1/1969 | Bannister | 29—200B |
| 3,444,606 | 5/1969 | Jones | 29—200B |

THOMAS H. EAGER, Primary Examiner

U.S. Cl. X.R.

29—200B, 441

UNITED STATES PATENT OFFICE
CERTIFICATE OF CORRECTION

Patent No. 3,581,361      Dated June 1, 1971

Inventor(s) Robert J. Loubier

It is certified that error appears in the above-identified patent and that said Letters Patent are hereby corrected as shown below:

IN THE SPECIFICATION

Column 1, Line 55 - after "socket" insert ---assembly---
Column 5, Line 29 - "two holders" should be ---tool holder---

Signed and sealed this 28th day of March 1972.

(SEAL)
Attest:

EDWARD M. FLETCHER, JR.
Attesting Officer

ROBERT GOTTSCHALK
Commissioner of Patents

FORM PO-1050 (10-69)